(12) United States Patent
Qin et al.

(10) Patent No.: US 11,346,971 B2
(45) Date of Patent: May 31, 2022

(54) IMAGING SUBTERRANEAN FEATURES USING FOURIER TRANSFORM INTERPOLATION OF SEISMIC DATA

(71) Applicant: Saudi Arabian Oil Company, Dhahran (SA)

(72) Inventors: Fuhao Qin, Dhahran (SA); Pierre Leger, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 215 days.

(21) Appl. No.: 16/570,624

(22) Filed: Sep. 13, 2019

(65) Prior Publication Data

US 2020/0408943 A1 Dec. 31, 2020

Related U.S. Application Data

(60) Provisional application No. 62/866,993, filed on Jun. 26, 2019.

(51) Int. Cl.
 *G01V 1/36* (2006.01)
 *G01V 1/32* (2006.01)
(52) U.S. Cl.
 CPC .............. *G01V 1/362* (2013.01); *G01V 1/325* (2013.01); *G01V 2210/43* (2013.01); *G01V 2210/57* (2013.01)
(58) Field of Classification Search
 CPC .... G01V 1/325; G01V 1/362; G01V 2210/43; G01V 2210/57
 See application file for complete search history.

(56) References Cited

U.S. PATENT DOCUMENTS

| 7,751,277 | B2 | 7/2010 | Schonewille |
| 8,619,498 | B2 | 12/2013 | Xu et al. |
| 9,213,120 | B2 | 12/2015 | Kostov et al. |
| 9,310,502 | B2 | 4/2016 | Ozdemir et al. |
| 9,715,027 | B2 | 7/2017 | Gersztenkorn |

(Continued)

FOREIGN PATENT DOCUMENTS

| EP | 2103595 | 9/2009 |
| EP | 2103959 | 9/2009 |

OTHER PUBLICATIONS

Abma et al, "Comparison of interpolation algorithms,"The Leading Edge, 24, pp. 984-989, Oct. 2005, 6 pages.

(Continued)

*Primary Examiner* — Elias Desta
(74) *Attorney, Agent, or Firm* — Fish & Richardson P.C.

(57) ABSTRACT

Systems and methods for generating seismic images of subterranean features including: receiving raw seismic data of a subterranean formation; selecting a portion of the raw seismic data; transforming the selected portion of the raw seismic data from a first domain to a second domain; generating soft constraint data corresponding to the selected portion of the raw seismic data; calculating at least one weight using the generated soft constraint data; generating a weighted transformed data set by applying at least one weight to the transformed selected portion of the raw seismic data; selecting at least one data point of the generated weighted transformed data set; and removing the selected at least one data point from the weighted transformed data set to generate revised seismic data.

17 Claims, 8 Drawing Sheets

(56) References Cited

U.S. PATENT DOCUMENTS

| | | | |
|---|---|---|---|
| 9,939,543 B2* | 4/2018 | Beasley | G01V 1/364 |
| 10,169,652 B2 | 1/2019 | Poole | |
| 10,288,753 B2 | 5/2019 | Poole et al. | |
| 10,393,901 B2* | 8/2019 | Lu | G01V 1/36 |
| 10,983,234 B2* | 4/2021 | Turquais | G01V 1/3808 |
| 2014/0297192 A1 | 10/2014 | Nguyen et al. | |
| 2017/0248716 A1 | 8/2017 | Poole | |

OTHER PUBLICATIONS

Gulunay et al, "Seismic trace interpolation in the Fourier transform domain," Geophysics, 68, 1, pp. 355-369, Jan.-Feb. 2003, 15 pages.

Herrmann et al, "De-aliased, high-resolution Radon transforms," 70th Annual International Meeting, SEG 2000 Expanded Abstracts, pp. 1953-1956, 4 pages.

Moore et al, "Stable, efficient, high-resolution Radon transforms," 64th Annual Conference and Exhibition, EAGE, Extended Abstracts, F-34, May 2002, 4 pages.

Porsani "Seismic trace interpolation using half-step prediction filters," Geophysics, 64, 5, pp. 1461-1467 Sep.-Oct. 1999, 7 pages.

Qin et al, "A robust implementation and application of antileakage Fourier transform interpolation," The Leading Edge, No. 7, pp. 538-542, Jul. 2018, 6 pages.

Qin et al, "An effective f-k domain random noise suppression technique applied to a land data set," 82nd Annual International Meeting, SEG, Expanded Abstracts, 2012, 5 pages.

Sacchi et al, "Data reconstruction by generalized deconvolution," 74th Annual International Meeting, SEG, Expanded Abstracts, pp. 1989-1992, Oct. 2004, 4 pages.

Schonewille et al, "Anti-alias anti-leakage Fourier transform," 79th Annual International Meeting, Houston, SEG, Expanded Abstracts, pp. 3249-3253, 2009, 5 pages.

Spitz, "Seismic trace interpolation in the f-x domain," Geophysics, 56, 6, pp. 785-794, Jun. 1991, 10 pages.

Trad "Five-dimensional interpolation: Recovering from acquisition constraints," Geophysics, 74, 6, pp. V123-V132, Nov.-Dec. 2009, 10 pages.

Whiteside et al, "5D data regularization using enhanced antileakage Fourier transform," 85th Annual International Meeting, Denver, SEG, Expanded Abstracts, pp. 3616-3620, 2014, 5 pages.

Xu et al, "Antileakage Fourier transform for seismic data regularization," Geophysics, 70, 4, pp. V87-V95, Jul.-Aug. 2005, 9 pages.

PCT International Search Report and Written Opinion in International Application No. PCT/US2020/039,535, dated Sep. 17, 2020, 16 pages.

GCC Examination Report issued in Gulf Cooperation Council Appln. No. 2020-39973, dated Sep. 2, 2021, 4 pages.

* cited by examiner

IMAGING SUBTERRANEAN FEATURES USING FOURIER TRANSFORM INTERPOLATION OF SEISMIC DATA

TECHNICAL FIELD

The present disclosure generally relates to generating seismic images of subterranean features.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications, for example, identification of potential petroleum reservoirs. Seismic surveys are conducted by using a controlled seismic source (for example, Vibroseis™ or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This specification describes systems and methods for imaging subterranean features in which seismic noise associated with seismic data is suppressed by interpolating the seismic data to finer spacing, which can reduce aliasing. A Fourier transform interpolation scheme is used that can facilitate interpolation of seismic results for sparse data sets. The systems and methods use a weighting scheme that involves generating soft constraint data that effectively assigns greater weights to seismic events generated by relatively simple geological structures, and reduced weights to seismic events generated by relatively complex geological structures. After weighting, the events related to the relatively simple geological structures can be extracted more reliably by an iterative matching pursuit process. The soft constraint weighting scheme does not mathematically change the underlying equations used for interpolating the data. The described systems and methods can lead to a solution of an under-determined system of equations, which can have many solutions, that is more likely to come from a simpler geological structure than a more complex structure.

The term "soft constraint" is used in its mathematical sense to indicate constraints that have some variable values that are penalized in the objective function if, and based on the extent that, the conditions on the variables are not satisfied. In contrast, "hard constraints" set conditions for the variables that are required to be satisfied.

In at least one aspect of the present disclosure, systems and methods for generating seismic images of subterranean features include: receiving raw seismic data of a subterranean formation; selecting a portion of the raw seismic data; transforming the selected portion of the raw seismic data from a first domain to a second domain; generating soft constraint data corresponding to the selected portion of the raw seismic data; calculating at least one weight using the generated soft constraint data; generating a weighted transformed data set by applying at least one weight to the transformed selected portion of the raw seismic data; selecting at least one data point of the generated weighted transformed data set; and removing the selected at least one data point from the weighted transformed data set to generate revised seismic data. Embodiments of these systems and methods can include one or more of the following features.

In some embodiments, the first domain comprises a space-time domain.

In some embodiments, the second domain comprises a frequency-wavenumber (F—K) domain.

In some embodiments, transforming the selected portion of the raw seismic data comprises applying a two-dimensional Fourier transform.

In some embodiments, generating soft constraint data comprises imputing raw seismic data from a particular seismic receiver to locations proximate to the particular seismic receiver.

In some embodiments, calculating at least one weight using the generated soft constraint data comprises introducing a weighting function that averages a spectrum amplitude along one or more radial lines corresponding to the soft constraint data.

In some embodiments, generating a weighted transformed data set comprises applying the at least one weight to one or more Fourier coefficients of the transformed raw seismic data.

In some embodiments, selecting at least one data point of the generated weighted transformed data set comprises selecting a Fourier coefficient with a highest value.

In some embodiments, the systems and methods also include generating images of subterranean features in the subterranean formation based on the revised seismic data.

Embodiments of these systems and methods can include one or more of the following advantages. The present disclosure provides means for enhancing seismic image quality, when compared with conventional seismic imaging techniques, by providing denser and regularly distributed seismic data. Additionally, the present disclosure provides means for increasing computational efficiency, when compared with other seismic imaging techniques, as a result of regular sampling.

The systems and methods described in this specification apply an anti-leakage Fourier transform method to extract certain responses included within received seismic data by using a soft constraint weighting scheme. The described systems and methods can be used for processing data sets corresponding to sparse seismic surveys, especially for formations having seismic horizons or events with steep dips which are not effectively handled by traditional techniques. The described systems and methods also exploit the fact that some seismic surveys of formations with relatively simple geological structures include seismic traces that do not change rapidly with small changes of middle points and azimuths.

The details of one or more embodiments of these systems and methods are set forth in the accompanying drawings and the following description. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

Figure 1:
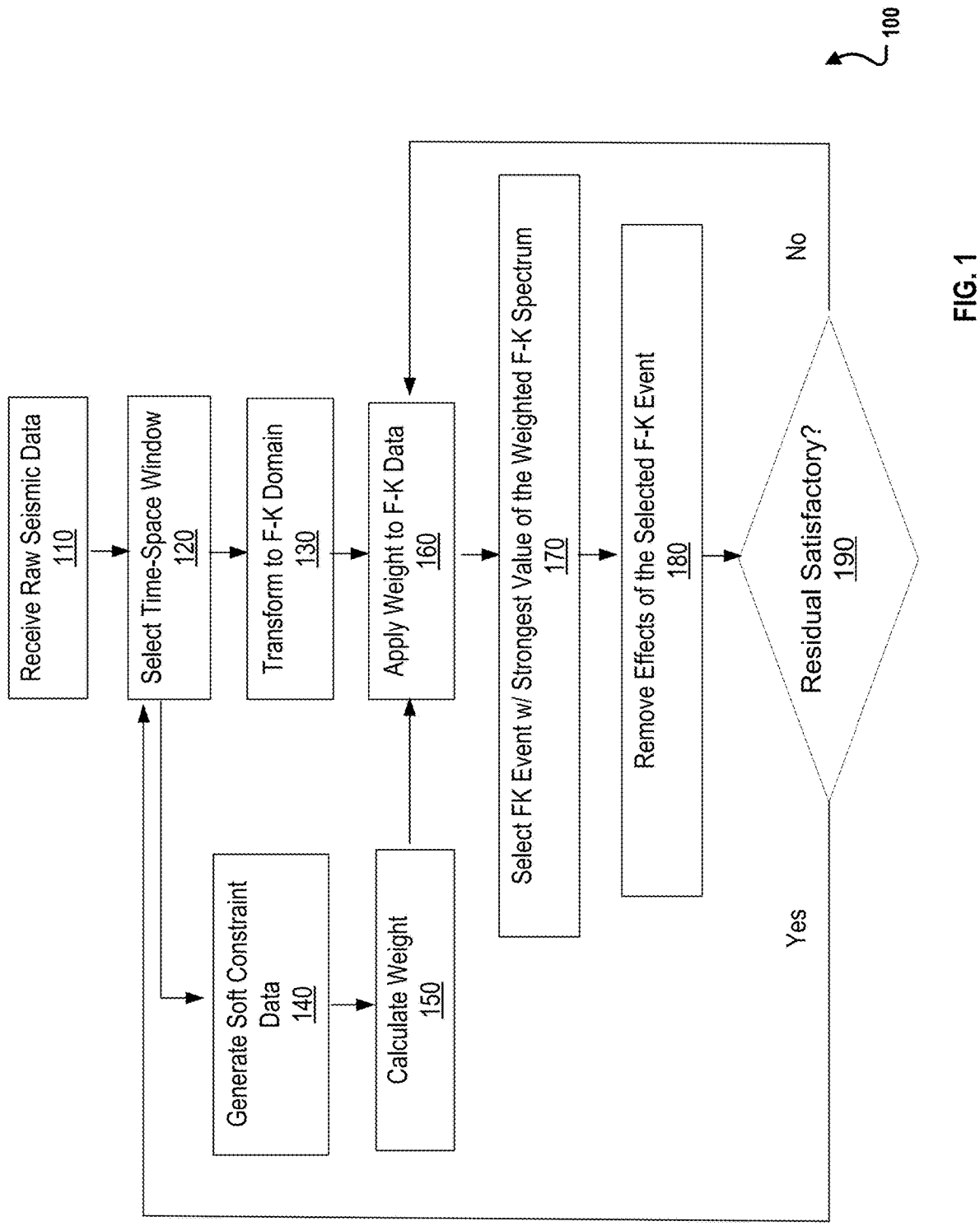
FIG. 1 is a flowchart depicting a method for seismic imaging using Fourier transform interpolation.

This specification describes systems and methods in which seismic data is interpolated in the F—K domain by using a Fourier transform interpolation method that introduces a weight to the F—K spectrum of the seismic data that can stabilize the anti-leakage Fourier transform method. Soft constraint data is generated and used to calculate the weights that are applied to the F—K spectrum of the data. After the weights have been applied, the strongest value of the weighted F—K spectrum is selected (that is, the most energetic Fourier coefficient), and the data points corresponding with this strongest value is removed from the original input data. This approach effectively assigns greater weights to seismic events generated by relatively simple geological structures, and reduced weights to seismic events generated by relatively complex geological structures.

Seismic data regularization typically involves spatially transforming irregularly sampled acquired seismic data to regularly sampled seismic data. Seismic data regularization generates seismic traces by interpolation or extrapolation from the acquired data on an irregular grid to a regular grid. One approach to seismic data regularization involves implementing Fourier theory by using a method that estimates the spatial frequency (wavenumber) content on the irregularly sampled grid. The data can then be reconstructed on a desired grid. Some difficulties may arise when implementing the Fourier theory due to the non-orthogonality of the global Fourier basis functions on an irregular grid, which can result in the problem of "spectral leakage," which refers to energy from one Fourier coefficient leaking onto others.

One approach to overcoming the spectral leakage problem is to implement an anti-leakage Fourier transform. The anti-leakage Fourier transform method seeks to solve an underdetermined linear system for the Fourier transform coefficients iteratively, as defined by the following:

$$D = A*S + \varepsilon \qquad (1)$$

where D is the input seismic data, A is the Fourier exponential matrix, S is the Fourier transform coefficient to be estimated, and $\varepsilon$ is the residual or noise.

In the anti-leakage Fourier transform method, the input data can be transformed from the space-time domain to the frequency-wavenumber (F—K) domain using a two-dimensional Fourier transform. The most energetic Fourier coefficient is solved first, as it can be assumed that this coefficient causes the most severe leakage. To attenuate the aliases and the leakage of this component onto other Fourier coefficients, the data component corresponding to this most energetic Fourier coefficient is subtracted from the original seismic data input on the irregular grid. Then, the new input (that is, the original data input minus data component corresponding to the most energetic coefficient) is used to solve for the next Fourier coefficient. This procedure can be repeated until all Fourier coefficients are estimated.

In some instances, the most energetic Fourier coefficient does not always correspond to a real event. For example, this can occur when the input data is relatively noisy. It may also correspond to wraparound of an aliased event or leaked energy from an event. In such scenarios, it can be useful to implement a weighting scheme that generates a weight by averaging the spectrum amplitude along the radial lines of the F—K data. This weight is applied to all data points of the F—K input data before choosing the most energetic coefficient.

In some scenarios, such as when the input data is relatively sparse, relatively complex, or relatively noisy, it can be beneficial to generate a soft constraint on the weighting scheme that imputes data for weighting purposes to improve the coherency of seismic events. By assigning greater weights to seismic events generated by relatively simple geological structures, and reduced weights to seismic events generated by relatively complex geological structures, this approach is particularly effective for subterranean formations such as those in onshore eastern Saudi Arabia. FIG. 1 is a flowchart depicting a method 100 for seismic imaging using Fourier transform interpolation. The method 100 includes receiving raw seismic data (block 110), selecting a time-space window of the raw seismic data (block 120), transforming the raw seismic data included within the selected time-space window to the F—K domain (block 130), generating soft constraint data from the selected time-space window (block 140), calculating a weight using the soft constraint data (block 150), applying the weight to the transformed seismic data (block 160), selecting a location corresponding with the highest value of the weighted transformed seismic data (block 170), removing the effects of the selected location (block 180) and determining if the residual is satisfactory (block 190). At block 110, the results of one or more seismic surveys are stored and organized to collect raw seismic data of a region of interest to be used for seismic imaging of the region of interest.

Figure 2:
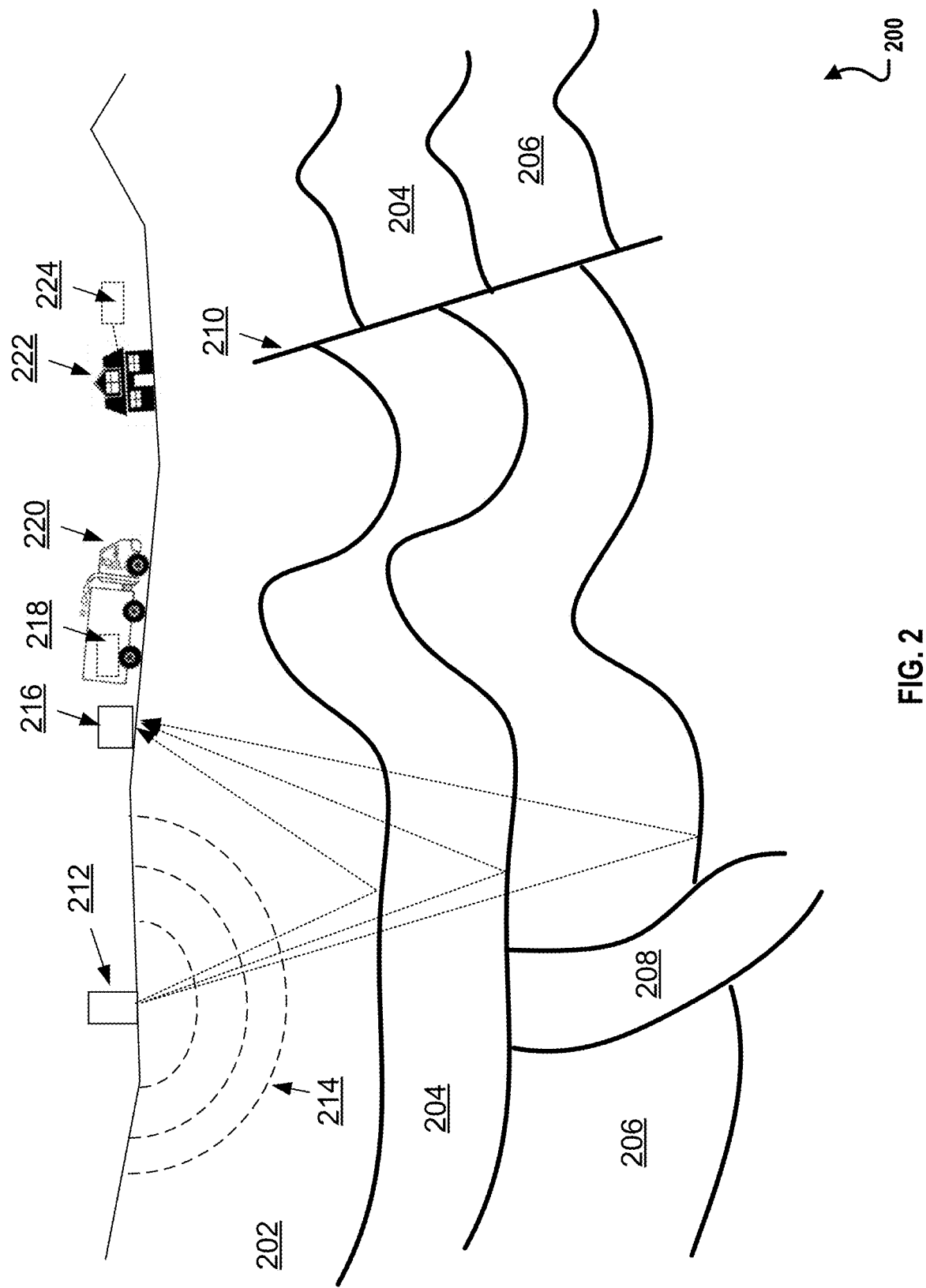
FIG. 2 is a schematic view of a seismic survey being performed to map subterranean features such as facies and faults.

FIG. 2 is a schematic view of a seismic survey being performed to map subterranean features such as facies and faults in a subterranean formation 200. The subterranean formation 200 includes a layer of impermeable cap rocks 202 at the surface. Facies underlying the impermeable cap rocks 202 include a sandstone layer 204, a limestone layer 206, and a sand layer 208. A fault line 210 extends across the sandstone layer 204 and the limestone layer 206.

A seismic source 212 (for example, a seismic vibrator or an explosion) generates seismic waves 214 that propagate in the earth. The velocity of these seismic waves depends on properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 200, the velocity of seismic waves traveling through the subterranean formation 200 will be different in the sandstone layer 204, the limestone layer 206, and the sand layer 208. As the seismic waves 214 contact interfaces between geologic bodies or layers that have different velocities, the interface reflects some of the energy of the seismic wave and refracts some of the energy of the seismic wave. Such interfaces are sometimes referred to as events or horizons.

The seismic waves 214 are received by a sensor or sensors 216. Although illustrated as a single component, the sensor or sensors 216 are typically a line or an array of sensors 216 that generate an output signal in response to received seismic waves including waves reflected by the horizons in the subterranean formation 200. The sensors 216 can be geophone-receivers that produce electrical output signals transmitted as input data, for example, to a computer 218 on a seismic control truck 220. Based on the input data, the computer 218 may generate a seismic data output, for example, a seismic two-way response time plot.

A control center 222 can be operatively coupled to the seismic control truck 220 and other data acquisition and wellsite systems. The control center 222 may have computer facilities for receiving, storing, processing, and analyzing data from the seismic control truck 220 and other data acquisition and wellsite systems. For example, computer systems 224 in the control center 222 can be configured to analyze, model, control, optimize, or perform management tasks of field operations associated with development and production of resources such as oil and gas from the subterranean formation 200. Alternatively, the computer systems 224 can be located in a different location than the control center 222. Some computer systems are provided with functionality for manipulating and analyzing the data, such as performing seismic interpretation or borehole resistivity image log interpretation, to identify geological surfaces in the subterranean formation or performing simulation, planning, and optimization of production operations of the wellsite systems.

In some embodiments, results generated by the computer system 224 may be displayed for user viewing using local or remote monitors or other display units. One approach to analyzing seismic data is to associate the data with portions of a seismic cube representing represent the subterranean formation 200. The seismic cube can also be display results of the analysis of the seismic data associated with the seismic survey.

Referring back to FIG. 1, additionally or alternatively, the raw seismic data obtained by the seismic survey described with respect to FIG. 2 can be used as input (that is, existing seismic data) for the method 100. The raw seismic data can be recorded seismic waves for a particular acquisition geometry in the time-space domain.

At block 120, a time-space window of the received raw seismic data is selected.

Figure 3:
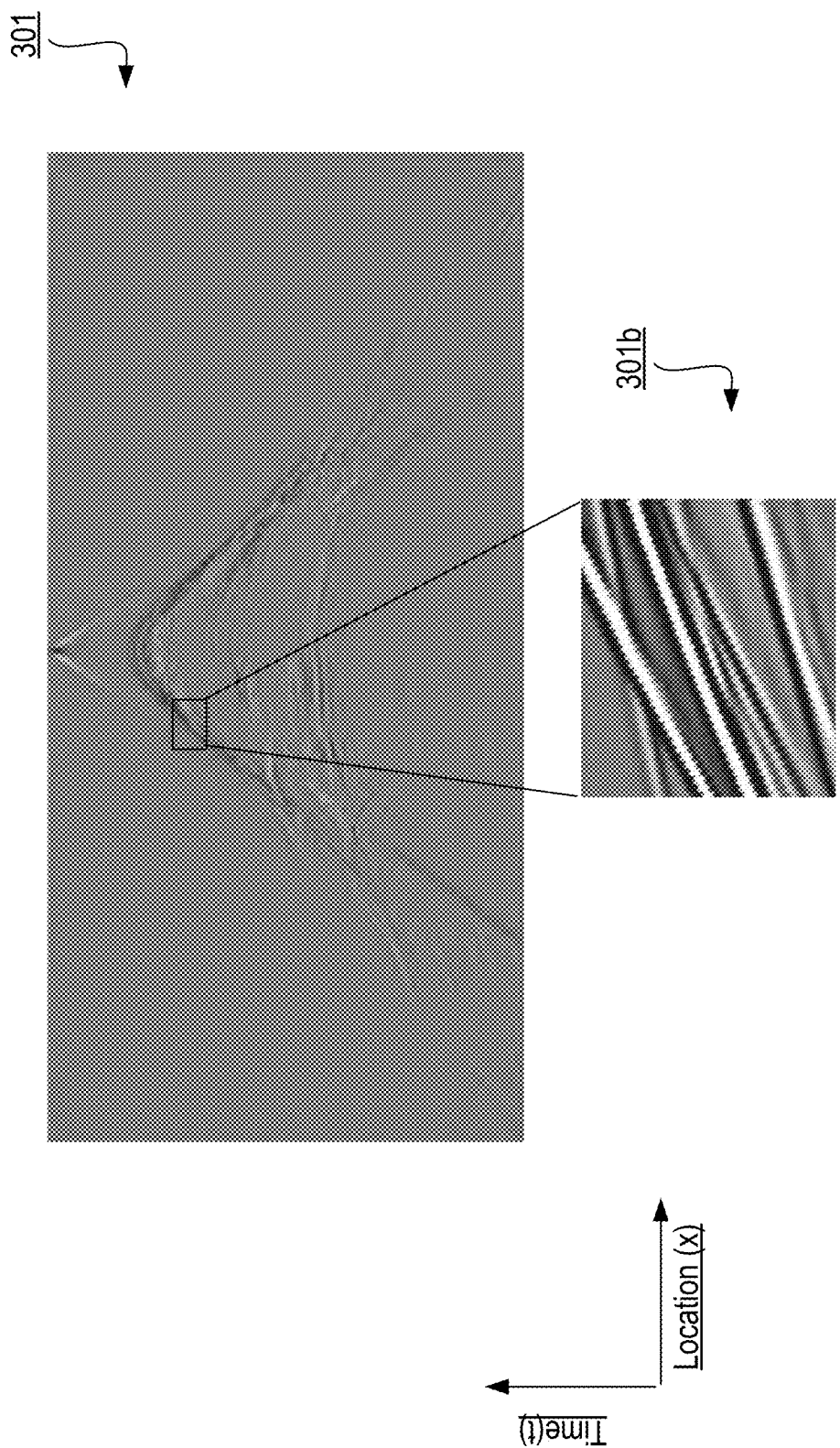
FIG. 3 depicts a seismic data set and a selection window corresponding to the seismic data set.

FIG. 3 depicts a seismic data set 301 and a selection window 301b corresponding to a portion of the seismic data set 301. In this example, the selection window 301b is located at a particular location in the seismic data set, and is a particular size. The size of the selection window can be chosen to be larger or smaller depending on efficiency and computational power considerations. Selecting a small temporal and spatial window relative to the distance from the source exploits the fact that seismic data is typically piecewise linear. For example, the seismic shot record depicted in the seismic data set 301 can appear relatively complex as a whole. However, the selection window 301b includes fewer seismic events that are close to being linear.

Referring back to FIG. 1, at block 130, the data included within the selected time-space window is transformed from the time-space domain to the F—K domain. In some implementations, the data is transformed by applying a two-dimensional Fourier transform (2DFT), which refers to a data processing technique that decomposes a function of time into its constituent frequencies. In this approach, s(x,t) represent the wave-fields generated in a seismic survey in the time-space domain with x representing the source and receiver coordinates and t represents time. The seismic acquisition A(x) can be considered as a window function where it is "1" when the source and receiver coordinates are paired to record a seismic trace, and it is "0" where no seismic trace is recorded.

$$A(x) = \begin{cases} 1; x \in \text{acquization geometry} \\ 0; \text{otherwise} \end{cases} \quad (2)$$

Furthermore, the collected seismic time-space data D(x,t) can be expressed as the wave-field multiplied by the window function, as represented by the following formulation:

$$D(x,t)=S(x,t) \cdot A(x) \quad (3)$$

The Fourier transform of the data D(x,t) can be considered as the convolution of the F—K response of the window function with that of the data itself, as represented in the following formulation:

$$D(f,k)=S(f,k)*A(k) \quad (4)$$

where D(f,k) is the F—K domain input data, A(k) is the Fourier transform of the acquisition window function, and S(f, k) is the Fourier coefficients to be estimated of the seismic wave-field.

Figure 4:
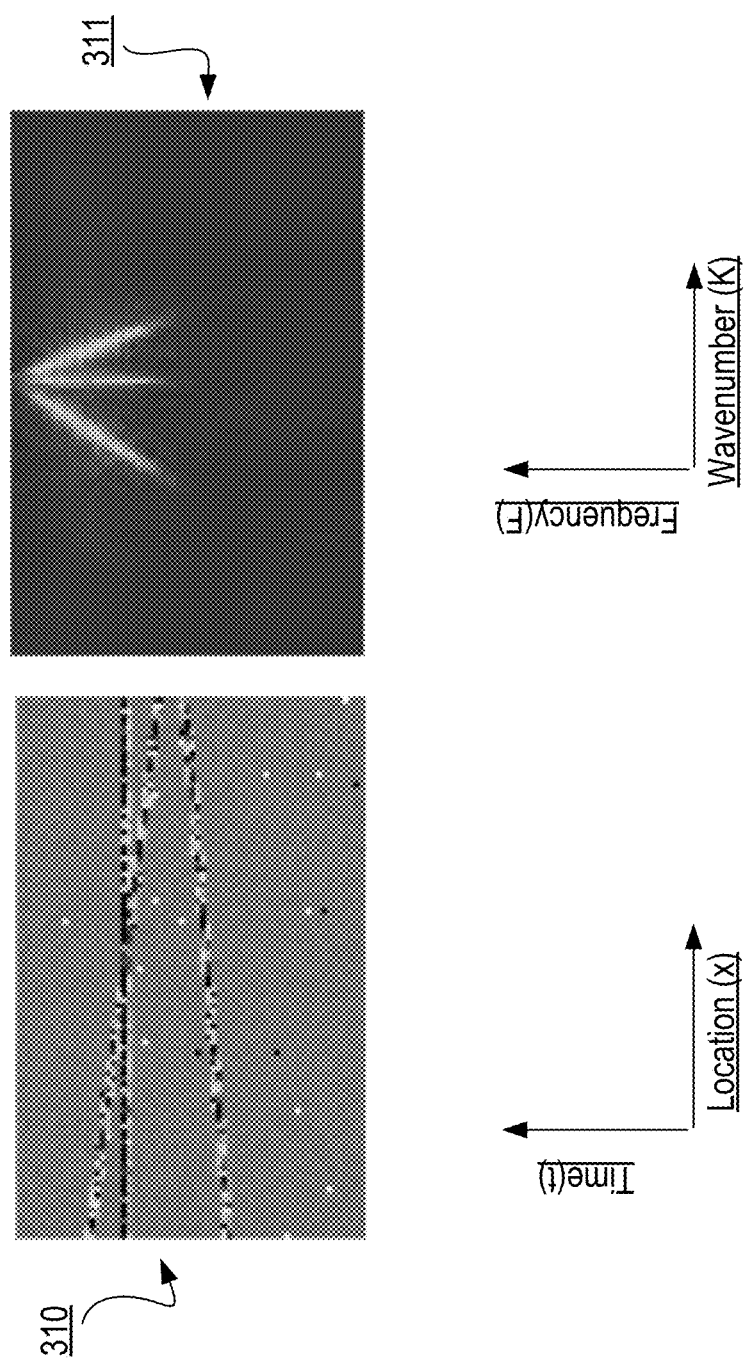
FIG. 4 depicts the transformation of seismic data to a frequency-wavenumber domain.

FIG. 4 depicts the transformation of seismic data to a frequency-wavenumber domain. As shown, a 2DFT is applied to the data included within the time-space window 310 to generate an F—K domain window 311. As also shown, linear seismic events in the time-space domain are also linear events in the F—K domain. Furthermore, as shown in the F—K domain window 311, F—K domain responses of linear seismic events include radiating lines away from the origin (f=0, k=0).

Referring back to FIG. 1, in some implementations, all Fourier coefficients of the input data are computed iteratively using the following formulation:

$$|D_{n-1}(f,k_i)| \geq |D_{n-1}(f,k)|; \text{ for any } k \text{ values} \quad (5)$$

where $D_{n-1}(f,k_i)$ is most energetic F—K component of the seismic data. In some instances, it is assumed that the most energetic F—K component is not significantly affected by the Fourier transform leakage caused by the window function.

At block 140, soft constraint data is generated for the selected time-space window. Generating soft constraint data includes generating new input points within the selected time-space window. New input points are generated by making small azimuth rotations and horizontal shifts of common offset gathers.

Figure 5:
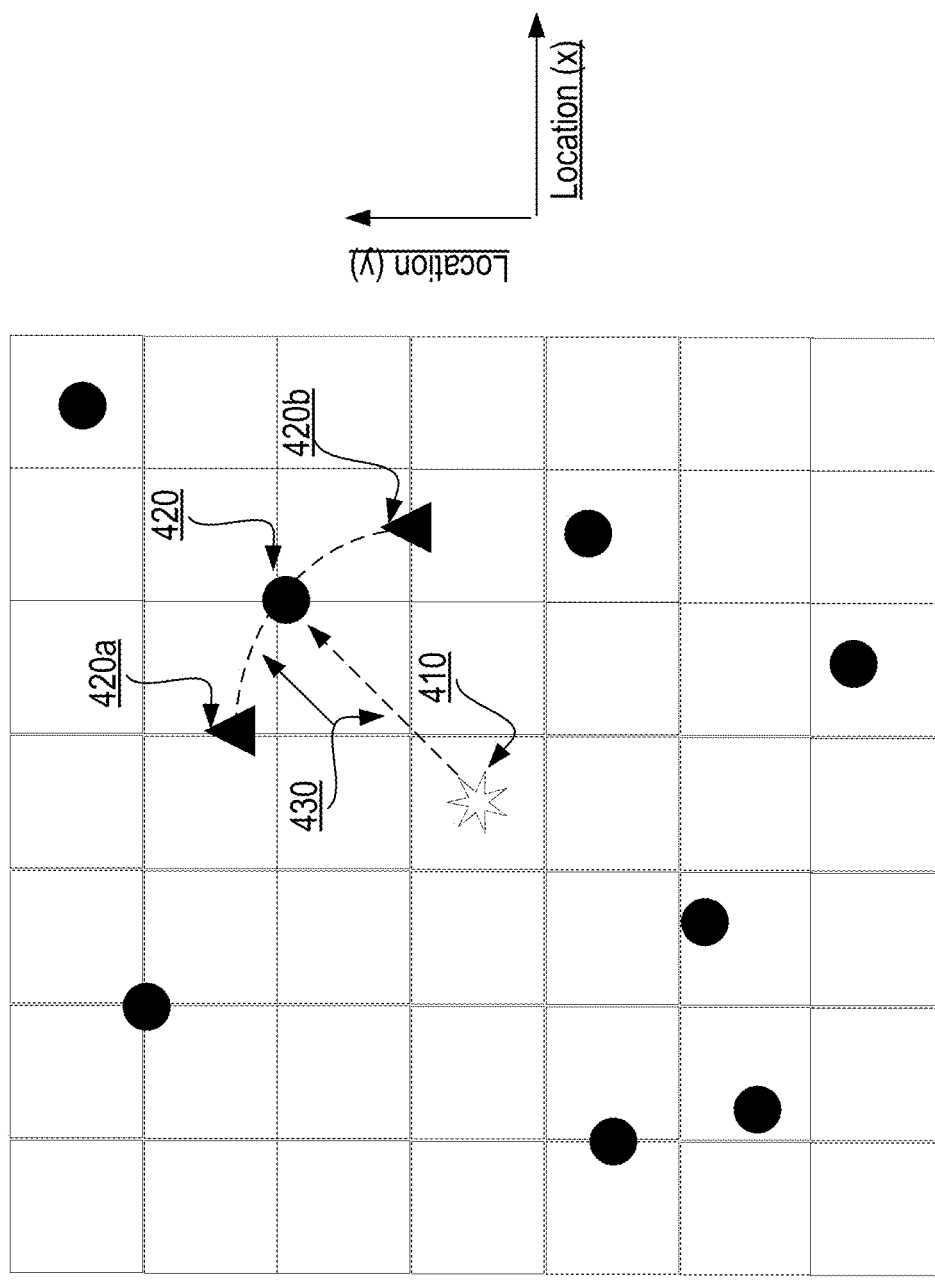
FIG. 5 depicts a process of generating soft constraints by rotating and shifting seismic traces.

FIG. 5 depicts a process of generating soft constraints by rotating and shifting traces. As shown, the azimuth 430 of a trace associated with a receiver 420 and a source 410 can be shifted to add new trace locations 420a, 420b. As a result, the trace data associated with the receiver 420 is imputed to the locations 420a, 420b proximate to the location of the receiver 420. This generates new data to supplement the original data received at block 110, which can be particularly advantageous when the received data is sparse. In FIG. 5, the actual data is represented by circles and the artificial data is represented by triangles. The rotation and shifting is performed for each of the actual data traces.

Figure 6:
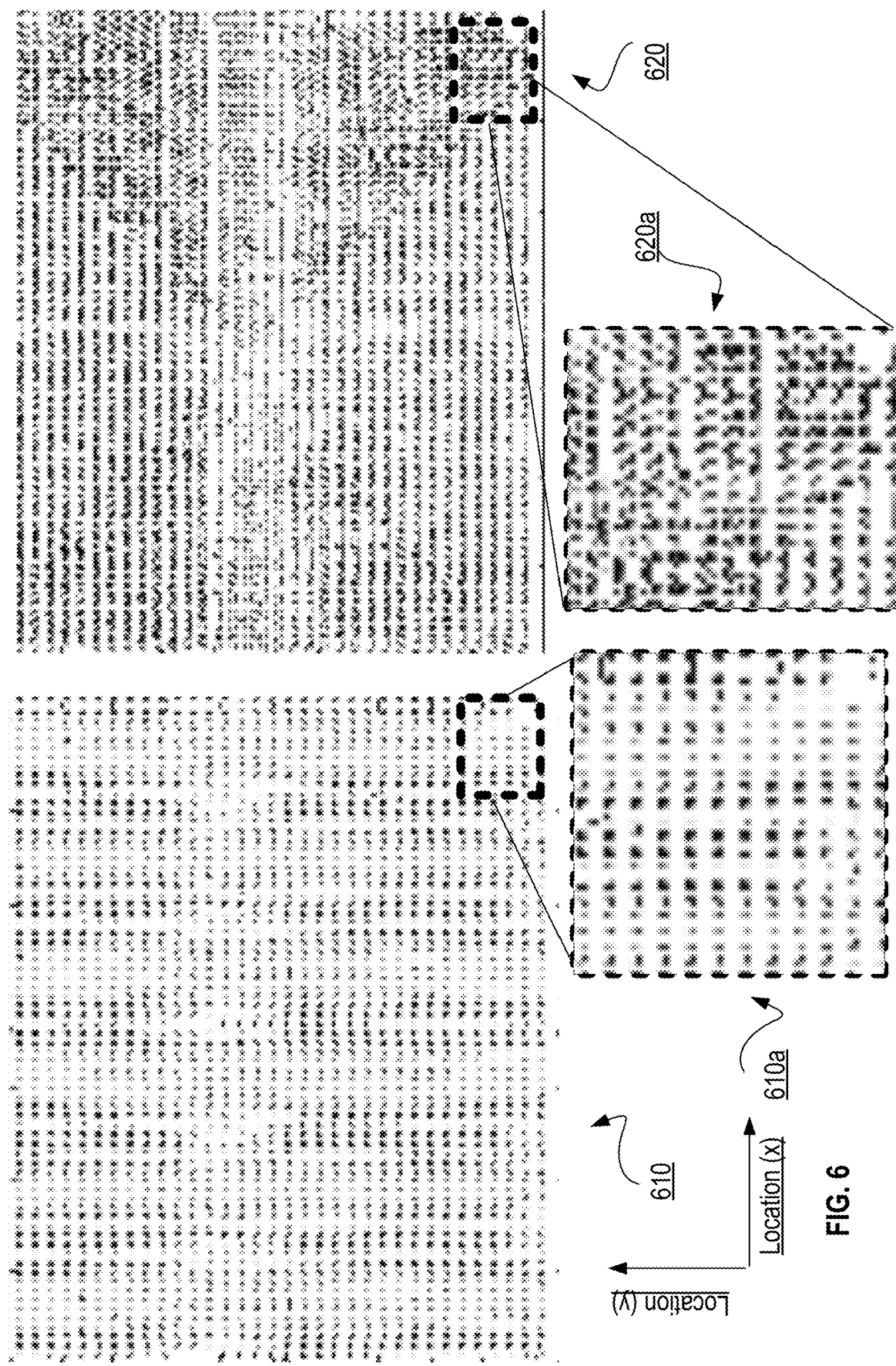
FIG. 6 depicts an original seismic trace data set and a soft constraint seismic trace data set.

FIG. 6 depicts an original seismic trace data set 610 and a soft constraint seismic trace data set 620. As shown, as a result of the new trace data from by rotating and shifting the traces, the soft constraint seismic data set 620 includes more seismic trace data than the original seismic trace data 610 received at block 110. Comparing the zoomed-in portion 620a of the soft constrain seismic trace data set 620 with a corresponding zoomed-in portion 610a of the original seismic trace data set 610, the zoomed-in portion 620a of the soft constraint seismic trace data set 620 illustrates the additional data points generated by the approach described with respect to FIG. 5.

Referring back to FIG. 1, at block 150 a weight is calculated for the generated soft constraint data. The weight is calculated by introducing a weighting function that averages the spectrum amplitude along the radial lines (as shown in FIG. 4) of the F—K transformed data, which now includes the soft constraint data, within the F—K domain window. In some implementations, for each (w,k) grid of the generated soft constraint data, a weight is calculated by summing the spectrum amplitudes along the radiating line defined by (0,0) and (w,k) over several frequency grids according to the following formulation:

$$W_{n-1}(f_j, k) = \sum_{f=f_j-\Delta f}^{f=f_j+\Delta f} \left| D_{n-1}\left(f, \frac{f \cdot k}{f_j}\right) \right| \quad (6)$$

At block 160, the weight is applied to each calculated Fourier coefficients in the F—K domain window. In some implementations, the coefficient with the maximum value of the weighted spectrum energy is found according to the following relationship:

$$|D_{n-1}(f,k_i) \cdot W_{n-1}(f,k_i)| \geq |D_{n-1}(f,k) \cdot W_{n-1}(f,k)| \quad (7)$$

By using the soft constraint data, problems associated with interpolating sparse data can be alleviated, as stronger seismic events (such as strong direct arrivals and reflections) that do not vary rapidly with mid-point and azimuth shifting are weighted more, and thus emphasized more than weaker events (such as diffractions). Furthermore, by using the weighting scheme, the true spectrum of seismic events can be amplified by greater weight over the energy leakage caused by the acquisition window function or frequency wrap-around.

At block 170, the data (seismic event) in the F—K domain window corresponding to the highest (that is, the most energetic) weighted Fourier coefficient is selected.

At block 180, the selected data is removed. In some implementations, the contribution of the F—K component associated with the selected most energetic weighted Fourier coefficient is removed in the space-time domain using the following relationships:

$$D_n(x,t) = D_{n-1}(x,t) - \mathcal{F}^{-1}(D_{n-1}(f,k)) \cdot A(x) \quad (8)$$

$$D_n(f,k) = \mathcal{F}(D_n(x,t)) \quad (9)$$

where $\mathcal{F}^{-1}$ refers to the inverse Fourier transform. As a result, stronger, noisier events are removed from the data set and the resulting data can be interpolated with increased stability.

Figures 7A, 7B:
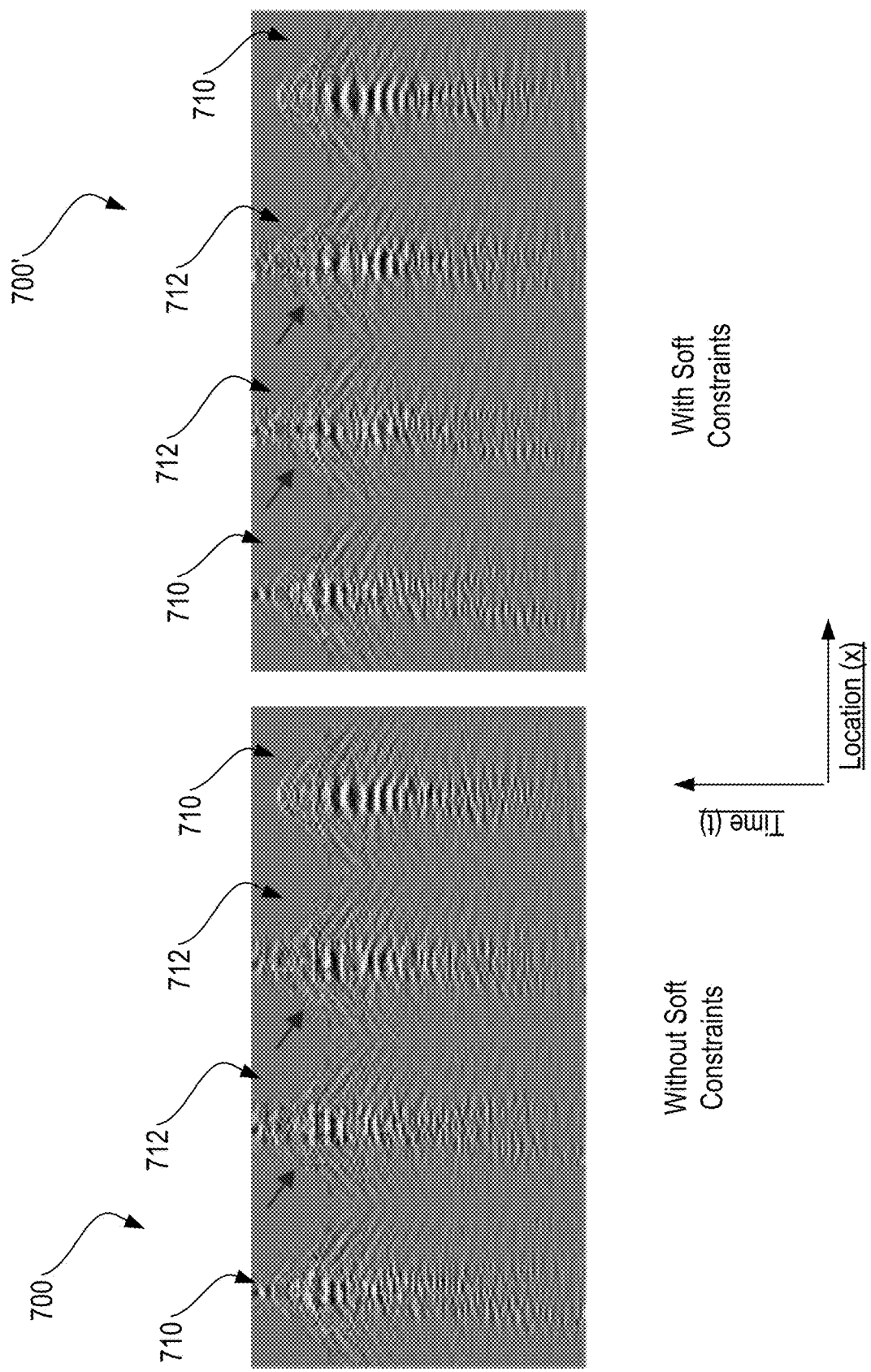
FIGS. 7A and 7B depict a seismic image generated without using soft constraints compared to a seismic image generated using soft constraints.

FIG. 7A is a seismic image 700 generated without using soft constraints and FIG. 7B is a seismic image 700' generated using soft constraints. Both images include actual data 710 on the left and right sides with interpolated data 712 between the sets of actual data. In this case, the very top hyperbolic event in the image is the hardest event to interpolate due to its steep dipping angle. The interpolation result using the soft constraint is cleaner and more continuous than that generated without the soft constraint. It also shows better similarity with the non-interpolated data than the interpolated data associated with the images generated without using the soft constraint data.

At block 190, the process continues until a satisfactory condition is met. In some implementations, a satisfactory condition is met when the energy of $D_n(f,k)$ decreases to a certain level or after a certain number of iterations. That is, $D_n(x,t)$ is Fourier transformed to the F—K domain for another iteration until the energy of $D_n(f,k)$ decreases to a predetermined level, or until a predetermined number of iterations have been performed. In some implementations, when removing the contribution of the most energetic coefficient, the computations can be done in the F—K domain by estimating the energy leakage through the convolution with the Fourier domain acquisition geometry $A(k)$. If the satisfactory condition is met, another time-space window is selected and the process is repeated for that time-space window.

Figure 8:
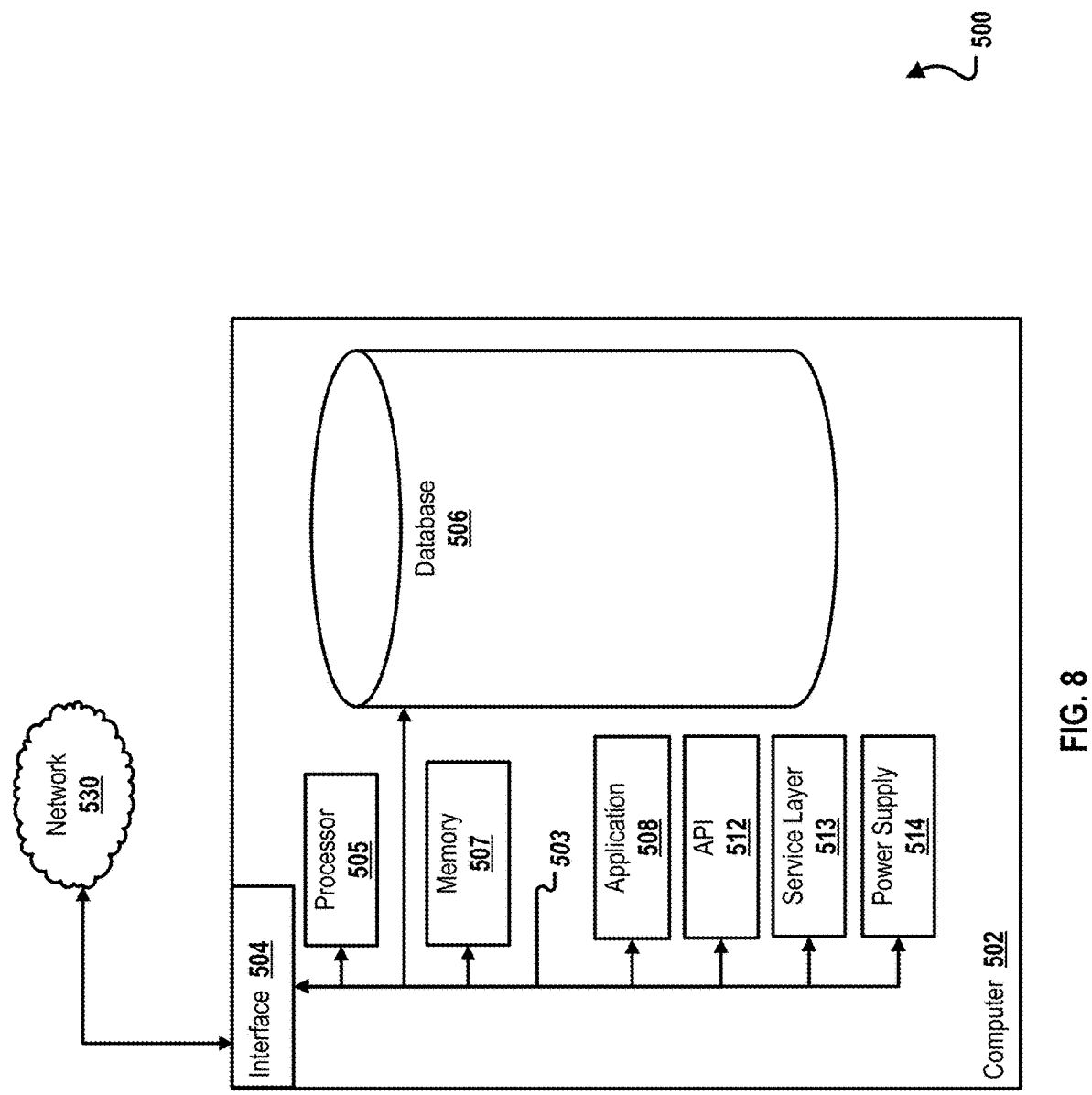
FIG. 8 is a block diagram of an example computer system used to provide computational functionalities associated with described algorithms, methods, functions, processes, flows, and procedures described in the present disclosure.

FIG. 8 is a block diagram of an example computer system 500 used to provide computational functionalities associated with described algorithms, methods, functions, processes, flows, and procedures described in the present disclosure (such as the method 100 described previously with reference to FIG. 1), according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 8, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 8, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 8, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 8, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU- RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

What is claimed is:

1. A computer-implemented method for generating seismic images of subterranean features, the method comprising:
   receiving raw seismic data of a subterranean formation;
   selecting a portion of the raw seismic data;
   transforming the selected portion of the raw seismic data from a first domain to a second domain;
   generating soft constraint data corresponding to the selected portion of the raw seismic data;
   calculating at least one weight using the generated soft constraint data;
   generating a weighted transformed data set by applying at least one weight to the transformed selected portion of the raw seismic data;
   selecting at least one data point of the generated weighted transformed data set;
   removing the selected at least one data point from the weighted transformed data set to generate revised seismic data;
   amplifying, based on the removing, a true spectrum of the revised seismic data, wherein the true spectrum of the revised seismic data has a greater weight than energy leakage of the raw seismic data; and
   generating images of subterranean features in the subterranean formation based on the true spectrum of the revised seismic data.

2. The method of claim 1, wherein the first domain comprises a space-time domain.

3. The method of claim 1, wherein the second domain comprises a frequency-wavenumber domain.

4. The method of claim 1, wherein transforming the selected portion of the raw seismic data comprises applying a two-dimensional Fourier transform.

5. The method of claim 1, wherein generating soft constraint data comprises imputing raw seismic data from a particular seismic receiver to locations proximate to the particular seismic receiver.

6. The method of claim 1, wherein calculating at least one weight using the generated soft constraint data comprises introducing a weighting function that averages a spectrum amplitude along one or more radial lines corresponding to the soft constraint data.

7. The method of claim 1, wherein generating a weighted transformed data set comprises applying the at least one weight to one or more Fourier coefficients of the transformed raw seismic data.

8. The method of claim 1, wherein selecting at least one data point of the generated weighted transformed data set comprises selecting a Fourier coefficient with a highest value.

9. The method of claim 1, wherein generating soft constraint data corresponding to the selected portion of the raw seismic data comprises:
   generating additional seismic data from the raw seismic data for generating additional weighted transformed data, the additional seismic data being generated by:
      applying an azimuth rotation, a horizontal shift, or both to a common offset gather of the raw seismic data;
   combining the additional seismic data with the raw seismic data for generating additional weighted transformed data from the combined seismic data; and
   generating the images of the subterranean features in the subterranean formation based on the additional weighted transformed data.

10. A system configured to generate seismic images of subterranean features in a subterranean formation by weighting raw seismic data representing the subterranean formation, the system comprising:
    a sensor configured to measure reflections of seismic waves emitted into a geological formation and generate seismic data comprising a plurality of seismic traces;
    a computer memory; and
    at least one computer processor interoperably coupled with the computer memory and configured to perform operations comprising:
      receiving raw seismic data generated by the sensor, the raw data representing the subterranean formation;
      selecting a portion of the raw seismic data;
      transforming the selected portion of the raw seismic data from a first domain to a second domain;
      generating soft constraint data corresponding to the selected portion of the raw seismic data;
      calculating at least one weight using the generated soft constraint data;
      generating a weighted transformed data set by applying at least one weight to the transformed selected portion of the raw seismic data;
      selecting at least one data point of the generated weighted transformed data set;
      removing the selected at least one data point from the weighted transformed data set to generate revised seismic data
      amplifying, based on the removing, a true spectrum of the revised seismic data, wherein the true spectrum of the revised seismic data has a greater weight than energy leakage of the raw seismic data; and
      generating images of subterranean features in the subterranean formation based on the true spectrum of the revised seismic data.

11. The system of claim 10, wherein the first domain comprises a space-time domain.

12. The system of claim 10, wherein the second domain comprises a frequency-wavenumber domain.

13. The system of claim 10, wherein transforming the selected portion of the raw seismic data comprises applying a two-dimensional Fourier transform.

14. The system of claim 10, wherein generating soft constraint data comprises imputing raw seismic data from a particular seismic receiver to locations proximate to the particular seismic receiver.

15. The system of claim 10, wherein calculating at least one weight using the generated soft constraint data comprises introducing a weighting function that averages a spectrum amplitude along one or more radial lines corresponding to the soft constraint data.

16. The system of claim 10, wherein generating a weighted transformed data set comprises applying the at least one weight to one or more Fourier coefficients of the transformed raw seismic data.

17. The system of claim 10, wherein selecting at least one data point of the generated weighted transformed data set comprises selecting a Fourier coefficient with a highest value.

* * * * *